United States Patent
Liu et al.

(10) Patent No.: US 11,461,133 B2
(45) Date of Patent: Oct. 4, 2022

(54) METHOD FOR MANAGING BACKUP JOBS, ELECTRONIC DEVICE AND COMPUTER PROGRAM PRODUCT

(71) Applicant: EMC IP Holding Company LLC, Hopkinton, MA (US)

(72) Inventors: Min Liu, Shanghai (CN); Ming Zhang, Shanghai (CN); Ren Wang, Shanghai (CN); Xiaoliang Zhu, Shanghai (CN); Jing Yu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 310 days.

(21) Appl. No.: 16/888,787

(22) Filed: May 31, 2020

(65) Prior Publication Data

US 2021/0263770 A1 Aug. 26, 2021

(30) Foreign Application Priority Data

Feb. 25, 2020 (CN) .......................... 202010117692.3

(51) Int. Cl.
*G06F 9/48* (2006.01)
*G06F 3/06* (2006.01)
*G06F 11/14* (2006.01)

(52) U.S. Cl.
CPC ............ *G06F 9/4881* (2013.01); *G06F 3/065* (2013.01); *G06F 3/0619* (2013.01); *G06F 3/0673* (2013.01); *G06F 11/1461* (2013.01)

(58) Field of Classification Search
CPC ...... G06F 9/4881; G06F 3/0619; G06F 3/065; G06F 3/0673; G06F 11/1461; G06F 3/0607; G06F 3/0659; G06F 11/1448; G06F 11/1458
See application file for complete search history.

(56) References Cited

U.S. PATENT DOCUMENTS

2006/0242648 A1* 10/2006 Guccione ............... G06Q 10/06 718/105
2017/0109199 A1* 4/2017 Chen ..................... G06F 9/5027

* cited by examiner

*Primary Examiner* — Sisley N Kim
(74) *Attorney, Agent, or Firm* — Chamberlain, Hrdlicka, White, Williams & Aughtry

(57) ABSTRACT

Embodiments of the present disclosure relate to a method for managing backup jobs, an electronic device, and a computer program product. The method includes: determining expected execution durations of a group of to-be-executed backup jobs; dividing the group of to-be-executed backup jobs into a plurality of backup job subsets based on the expected execution durations, wherein a difference between the expected execution durations of every two backup jobs in each backup job subset does not exceed a predetermined threshold duration; and adjusting an execution plan of the group of to-be-executed backup jobs to cause the backup jobs in at least one backup job subset in the plurality of backup job subsets to simultaneously begin to be executed.

15 Claims, 4 Drawing Sheets

METHOD FOR MANAGING BACKUP JOBS, ELECTRONIC DEVICE AND COMPUTER PROGRAM PRODUCT

CROSS-REFERENCE TO RELATED APPLICATIONS

This application claims priority to Chinese Patent Application No. 202010117692.3 filed on Feb. 25, 2020. Chinese Patent Application No. 202010117692.3 is hereby incorporated by reference in its entirety.

TECHNICAL FIELD

Embodiments of the present disclosure relate to the field of computers, and in particular, to a method for managing backup jobs, an electronic device, and a computer program product.

BACKGROUND

In recent years, with the development of computer technologies, people have been paying increasingly more attention to the security of data storage. Data backup has also become a technology commonly used to ensure data security. As the scale of data backed up by users becomes increasingly larger, the number and scale of backup jobs submitted by the users also become larger. As the scale of backup jobs has increased, it has become increasingly difficult to manage the large number of backup jobs.

SUMMARY

The embodiment of the present disclosure provides a solution for managing backup jobs.

According to a first aspect of the present disclosure, a method for managing backup jobs is provided. The method includes: determining expected execution durations of a group of to-be-executed backup jobs; dividing the group of to-be-executed backup jobs into a plurality of backup job subsets based on the expected execution durations, wherein a difference between the expected execution durations of every two backup jobs in each backup job subset does not exceed a predetermined threshold duration; and adjusting an execution plan of the group of to-be-executed backup jobs to cause the backup jobs in at least one backup job subset in the plurality of backup job subsets to simultaneously begin to be executed.

According to a second aspect of the present disclosure, an electronic device is provided. The device includes: at least one processing unit and at least one memory. The at least one memory is coupled to the at least one processing unit, and stores an instruction configured to be executed by the at least one processing unit. The instruction is executed by the at least one processing unit to cause the device to execute actions. The actions include: determining expected execution durations of a group of to-be-executed backup jobs; dividing the group of to-be-executed backup jobs into a plurality of backup job subsets based on the expected execution durations, wherein a difference between the expected execution durations of every two backup jobs in each backup job subset does not exceed a predetermined threshold duration; and adjusting an execution plan of the group of to-be-executed backup jobs to cause the backup jobs in at least one backup job subset in the plurality of backup job subsets to simultaneously begin be executed.

According to a third aspect of the present disclosure, a computer program product is provided. The computer program product is stored in a non-transient computer storage medium, and includes a machine-executable instruction. The machine executable instruction is operated in a device to cause the device to execute any step of the method described according to the first aspect of the present disclosure.

The summary is provided in order to introduce the selection of concepts in a simplified form, which will be further described in the Detailed Description below. The summary is neither intended to identify key features or essential features of the present disclosure, nor intended to limit the scope of the present disclosure.

BRIEF DESCRIPTION OF FIGURES

The above and other objectives, features and advantages of the present disclosure will become more apparent by describing exemplary embodiments thereof in detail with reference to the accompanying drawings, and in the example embodiments of the present disclosure, the same reference numerals generally represent the same components.

DETAILED DESCRIPTION

Figure 1:
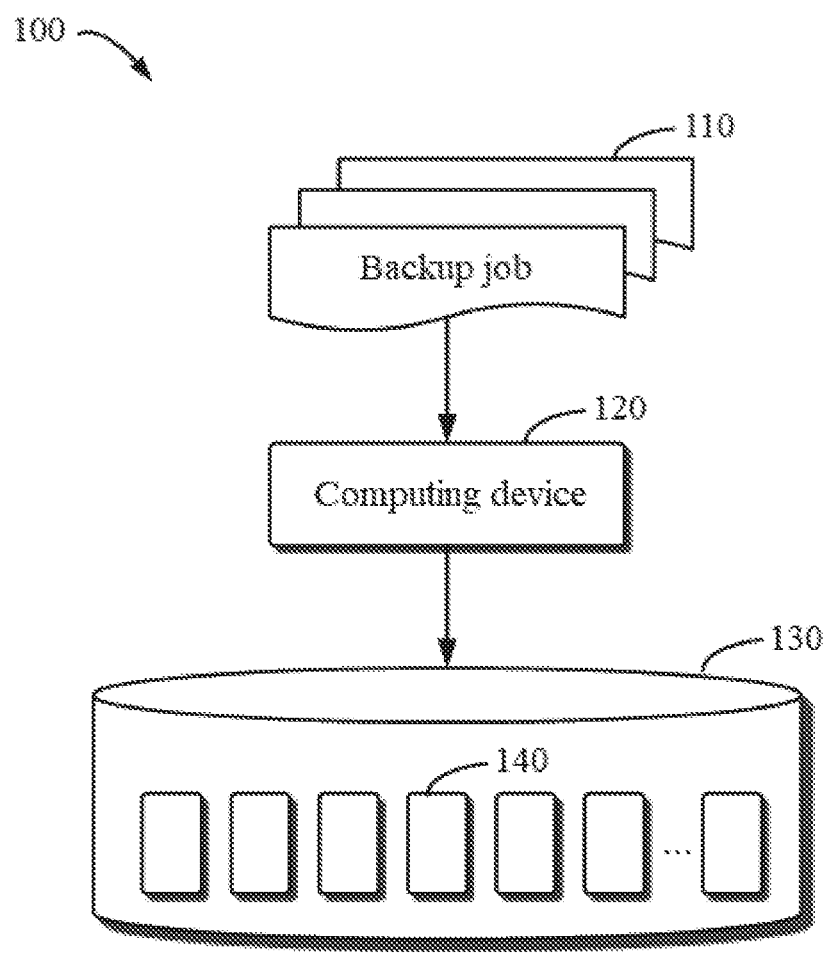
FIG. 1 illustrates a schematic diagram of an example environment where embodiments of the present disclosure may be implemented.

Preferred embodiments of the present disclosure will be described in more detail below with reference to the accompanying drawings. Although the drawings illustrate the preferred embodiments of the present disclosure, it should be understood that the present disclosure may be implemented in various forms and should not be limited to the embodiments illustrated herein. Rather, these embodiments are provided to make the present disclosure to be more thorough and complete, and will fully convey the scope of the present disclosure to those skilled in the art.

As used herein, the term "include," "comprise" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc. may refer to different or the same objects. Other explicit and implicit definitions may be included below.

As mentioned above, as the scale of data to be backed up by users becomes increasingly larger, the number and scale of backup jobs to be processed by a backup device has also become larger. Usually, it is difficult for an administrator to generate an efficient execution plan for a large scale of backup jobs, and the administrator may only generally specify a backup mode of each backup job and a backup frequency of each backup job. For example, the administrator may specify whether each backup job is a full volume backup or an incremental backup, and for example, may specify that the backup jobs need to be executed once every 24 hours.

In case of a very large number of to-be-executed backup jobs, it is difficult for a conventional solution to ensure that these backup jobs are executed according to the same order all the time, which may cause inconsistent executions of the backup jobs. In addition, even if the administrator may strictly specify the order in which these backup jobs are executed, considering that the duration of each backup job in each backup may change, it may be difficult to ensure that the ordering is followed. As a result, this may cause some backup jobs to fail to reach the specified backup frequency. For example, some backup jobs may take more than 24 hours before the next backup can be executed. This may affect the stability of backup data, and may even cause the loss of backup data, which is undesirable.

According to the embodiment of the present disclosure, a method for managing backup jobs is provided. In this method, expected execution durations of a group of to-be-executed backup jobs may be determined, and the group of to-be-executed backup jobs are divided into a plurality of backup job subsets based on the expected execution durations, wherein a difference between expected execution durations of every two backup jobs in each backup job subset does not exceed a predetermined threshold duration. Subsequently, an execution plan of the group of to-be-executed backup jobs is adjusted to cause the backup jobs in at least one backup job subset in the plurality of backup job subsets to simultaneously begin to be executed. In this way, the embodiment of the present disclosure may cause a plurality of backup jobs with the same expected execution durations to simultaneously begin to be executed, thereby ensuring the stability of execution of the backup jobs.

FIG. 1 illustrates a schematic diagram of environment 100 where the embodiment of the present disclosure may be implemented. As shown in FIG. 1, environment 100 includes computing device 120 and backup storage device 130. Computing device 120 may manage a plurality of to-be-executed backup jobs 110. In some embodiments, computing device 120 may also receive an execution plan associated with the plurality of backup jobs 110. The execution plan may specify, for example, predetermined start times when backup jobs 110 are expected to begin to be executed and expected backup frequencies of executing backup jobs 110. Computing device 120 may cause backup jobs 110 to be executed based on the execution plan, so as to write to-be-backed-up data to backup storage device 130, for example, to store the data as backup data block 140.

Figure 2:
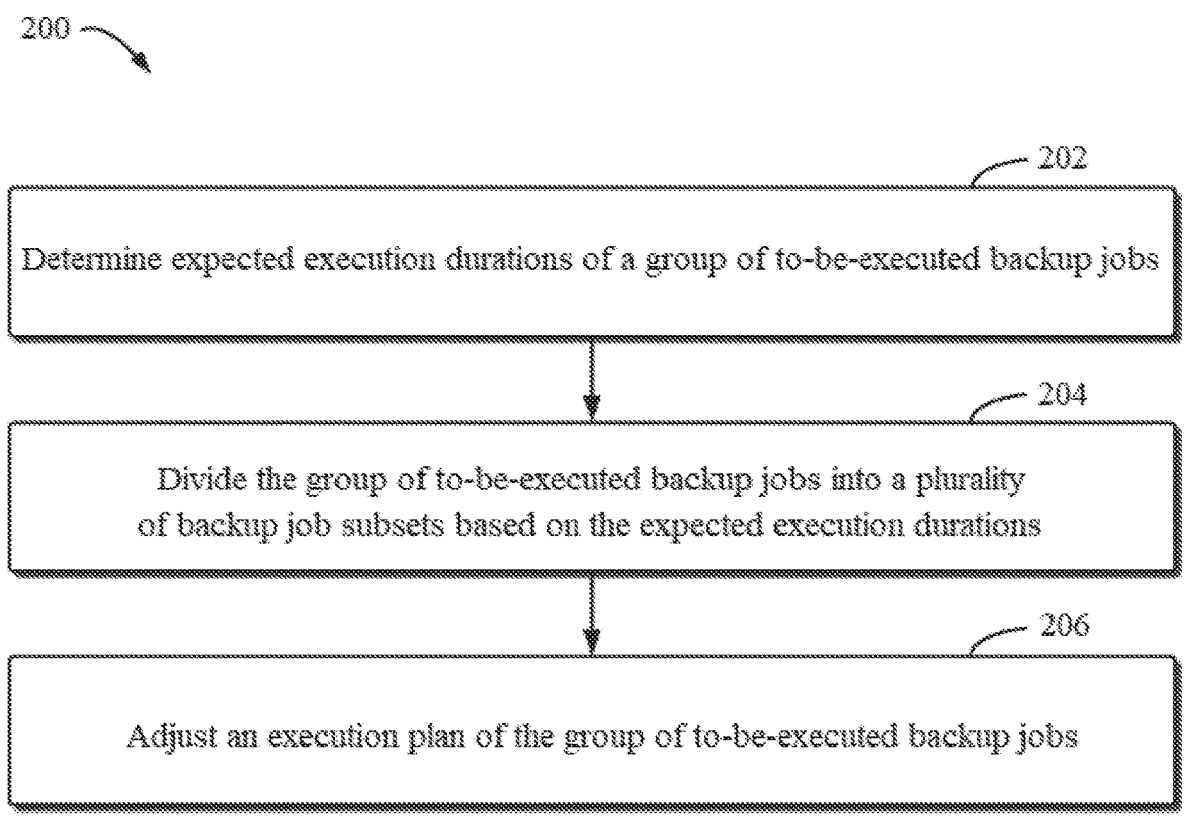
FIG. 2 illustrates a flow chart of a process of managing backup jobs according to an embodiment of the present disclosure.

In some embodiments, computing device 120 may determine expected execution durations of backup jobs 110, and adjust the execution plan of backup jobs 110 based on the expected execution durations. A process of managing the backup jobs according to the embodiment of the present disclosure will be described below with reference to FIGS. 2 to 5. FIG. 2 illustrates a flow chart of process 200 of managing backup jobs according to some embodiments of the present disclosure. Process 200 may be implemented, for example, by computing device 120 shown in FIG. 1.

As shown in FIG. 2, at block 202, computing device 120 determines expected execution durations of a group of to-be-executed backup jobs 110. In some embodiments, computing device 120 may, for example, determine the expected execution durations of the group of to-be-executed backup jobs 110 based on a group of historical backup jobs.

Specifically, computing device 120 may acquire historical execution information of one group of historical backup jobs. For example, computing device 120 may acquire a size of backup data of the group of historical backup jobs and execution durations or execution speeds thereof. Subsequently, computing device 120 may determine the expected execution durations of the group of to-be-executed backup jobs 110 based on the historical execution information.

As an example, computing device 120 may determine the execution durations of the historical backup jobs of the same sizes as those of the backup jobs 110 as the expected execution durations. As another example, computing device 120 may also, for example, determine the expected execution durations of backup jobs 110 based on linear fitting of the durations of the historical backup jobs. For example, when there is no historical backup job that is exactly of the same size as that of backup job 110, computing device 120 may, for example, determine the expected execution duration of backup job 110 based on linear fitting of execution duration of a historical backup job of an approximate size.

In some embodiments, computing device 120 may, for example, also use a machine learning method to determine the expected execution durations of backup jobs 110. Specifically, computing device 120 may, for example, use the historical execution information of the historical backup jobs as training data of a machine learning model. The historical execution information may include, for example, the sizes and the execution durations of the historical backup jobs and the number of concurrent backup jobs during execution. By using historical data to train the machine learning model, the model will be able to determine expected execution times of backup jobs of specific sizes by inputting specific calculation conditions such as a specific number of concurrent backup jobs and the like, thereby determining the expected execution durations of the group of to-be-executed backup jobs 110.

At block 204, computing device 120 divides the group of to-be-executed backup jobs 110 into a plurality of backup job subsets based on the expected execution durations. A difference between the expected execution durations of every two backup jobs in each backup job subset does not exceed a predetermined threshold duration.

In some embodiments, computing device 120 may, for example, divide a backup cycle into a plurality of time windows, and assign backup jobs with expected end time falling within the same time window into the same backup job subset. For example, the expected end time may be determined based on the time when the backup jobs are expected to begin to be executed and the expected execution durations. In one example, a time window may be determined to be 1 minute in size. For a plurality of backup jobs that are expected to begin to be executed at 10 am, backup jobs 110 with the expected end time falling within the time window between 10:10 and 10:11 will be assigned to the same backup job subset. In this way, the backup jobs with the same expected execution durations may be uniformly managed.

In some embodiments, when the backup job subsets are determined, computing device 120 may also consider the maximum number of concurrent backup jobs allowed by a backup system. For example, computing device 120 may make the number of backup jobs in each backup job subset not to exceed a predetermined threshold number. The threshold number may be, for example, the maximum number of concurrent backup jobs.

Figure 3:
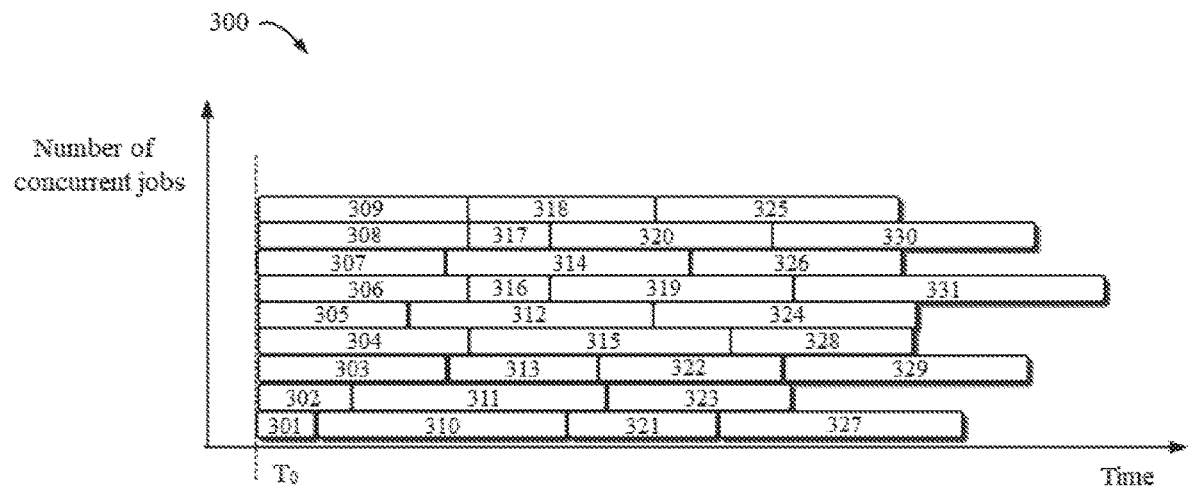
FIG. 3 illustrates a schematic diagram of execution of backup jobs according to one embodiment of the present disclosure.

The process of block 204 will be described below with reference to the example of FIG. 3, and FIG. 3 illustrates a schematic diagram 300 of executing backup jobs according to the embodiment of the present disclosure. As shown in FIG. 3, a group of to-be-executed backup jobs includes 31 backup jobs, i.e., backup job 301 to backup job 331. According to the specified execution plan, these backup jobs are expected to begin to be executed at the time $T_0$, and for example, an expected backup cycle is specified as 24 hours.

FIG. 3 illustrates, for example, a situation where these backup jobs are executed on the first day. As shown in FIG. 3, these backup jobs are continuously executed based on the maximum number of concurrent backup jobs allowed. In the example of FIG. 3, the maximum number of concurrent backup jobs is nine. However, as discussed above, the execution duration of each backup job may change in each backup process. For example, in the example of FIG. 3, in the backup process on the first day, backup job 301 starts backup from the time $T_0$ and takes 10 minutes to back up, and may take 15 minutes on the second day. At this time, the start time of backup job 310 originally started at $T_0+12$ minutes on the first day will change to $T_0+12$ minutes on the second day. This makes backup job 310 fail to meet a frequency requirement of backup once every 24 hours, which may lead to a risk of loss of the backup data.

According to the embodiment of the present disclosure, computing device 120 may determine the expected execution durations of backup job 301 to backup job 331, and group backup job 301 to backup job 331 based on the expected execution durations. As an example, computing device 120 may, for example, determine the execution durations of these backup jobs on the first day as the expected execution durations, and then group backup job 301 to backup job 331 below according to the constraints of the threshold duration and the maximum number of concurrent jobs:

First subset: {backup job 331};
Second subset: {backup job 327, backup job 329, and backup job 330};
Third subset: {backup job 303, backup job 307, and backup job 328};
Fourth subset: {backup job 305 and backup job 321};
Fifth subset: {backup job 302, backup job 316, and backup job 317};
Sixth subset: {backup job 301};
Seventh subset: {backup job 310, backup job 311, backup job 312, backup job 314, backup job 315, backup job 319, backup job 320, backup job 324, and backup job 325};
Eighth subset: {backup job 322 and backup job 323}; and
Ninth subset: {backup job 304, backup job 306, backup job 308, backup job 309, backup job 318, backup job 323, and backup job 326}.

For the above backup job subsets, the number of backup jobs in each backup job subset does not exceed the maximum number of concurrent backup jobs allowed by the backup system, and the difference between the expected execution durations of any two backup jobs in each backup job subset does not exceed 1 minute. Through such an organization method, the embodiment of the present disclosure may perform unified management on the original large number of backup jobs.

At block 206, computing device 120 adjusts the execution plan of the group of to-be-executed backup jobs 110, to cause backup jobs in at least one backup job subset in the plurality of backup job subsets to simultaneously begin to be executed.

Figure 4:
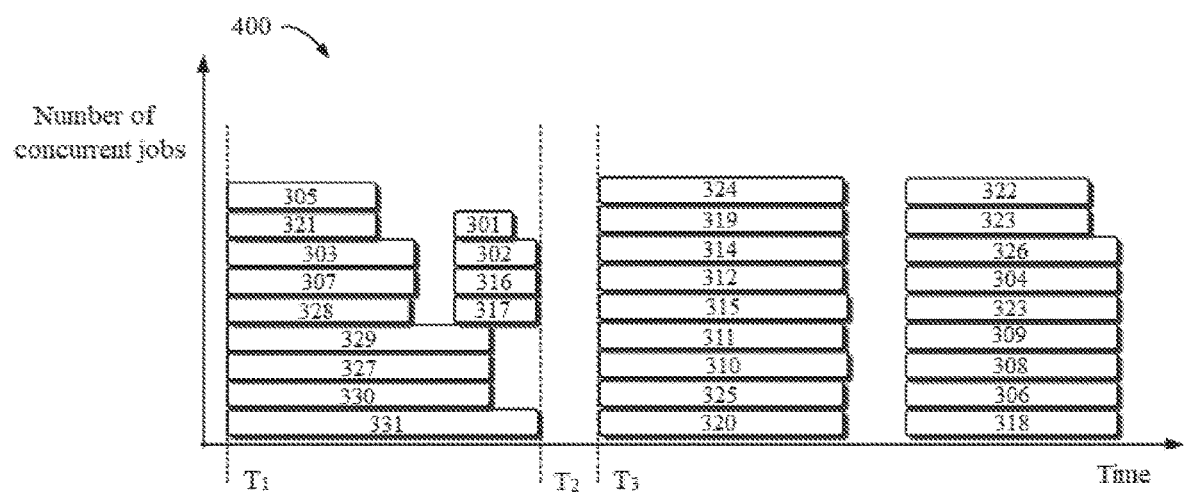
FIG. 4 illustrates a schematic diagram of adjustment of an execution plan of backup jobs according to an embodiment of the present disclosure.

Still referring to the example of FIG. 3, after backup job 301 to backup job 331 are divided into the plurality of backup job subsets according to the expected execution durations, computing device 120 may adjust the execution plan of the group of backup jobs according to the maximum number of concurrent backup jobs. FIG. 4 illustrates a schematic diagram 400 of adjustment of the execution plan of the backup jobs according to an embodiment of the present disclosure.

As shown in FIG. 4, computing device 120 may first consider the first subset {backup job 331} with the longest expected execution duration, and sequentially consider the remaining backup job subsets with expected execution durations. For example, computing device 120 may determine that a remaining subset with the longest expected execution duration is the second subset {backup job 327, backup job 329, and backup job 330}. Considering that the total number of backup jobs in the second subset and the first subset does not exceed the maximum number of concurrent backup jobs, computing device 120 may adjust the backup jobs to cause the backup jobs in the second subset and the backup jobs in the first subset to simultaneously begin to be executed.

Subsequently, for the remaining backup job subsets, the seventh subset {backup job 310, backup job 311, backup job 312, backup job 314, backup job 315, backup job 319, backup job 320, backup job 324, and backup job 325} has the longest expected execution duration. Considering that the sum of the number of backup jobs in this subset and the number of backup jobs in the first and second subsets has exceeded the maximum number of concurrent backup jobs, computing device 120 may adjust the execution plan to cause the backup jobs in the seventh subset to be executed at the end of execution of the backup jobs in the first subset. By performing the above process iteratively, computing device 120 may, for example, determine the execution plan as shown in FIG. 4. In this way, backup jobs with approximate expected execution durations simultaneously begin to be executed all the time, thereby making the execution of the backup jobs more stable.

Figure 5:
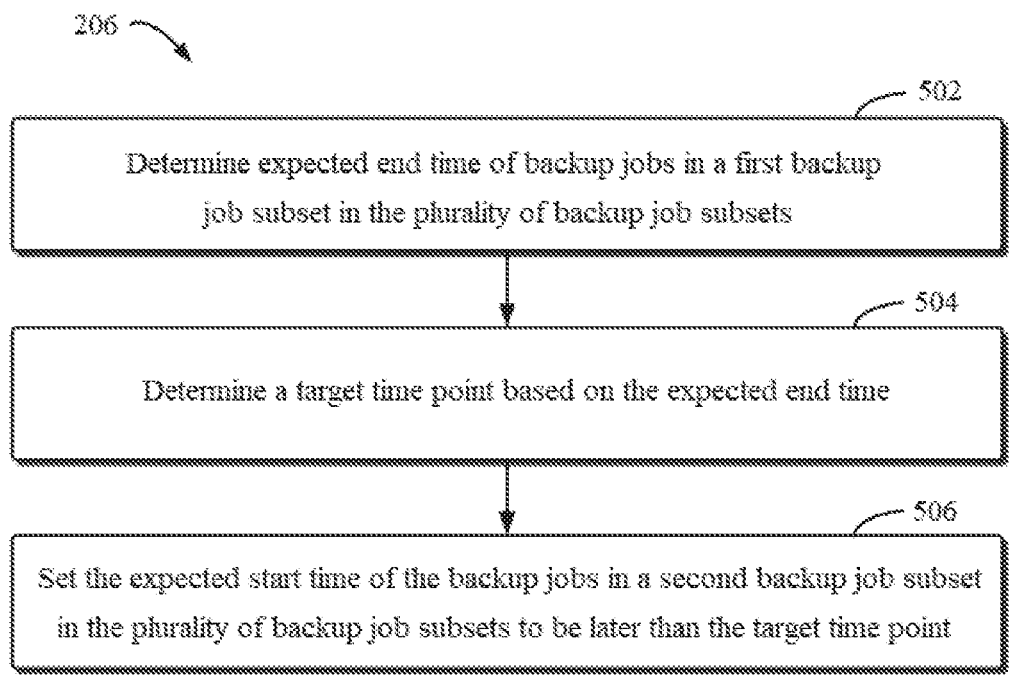
FIG. 5 illustrates a flow chart of a process of adjusting an execution plan according to an embodiment of the present disclosure.

In some embodiments, computing device 120 may also adjust the execution plan, so that there is no overlap in the execution of two adjacent backup job subsets, thereby further improving the stability of the execution of the backup jobs. The process of block 206 will be described below with reference to FIG. 5. FIG. 5 illustrates a flow chart of a process of adjusting the execution plan according to the embodiment of the present disclosure.

As shown in FIG. 5, at block 502, computing device 120 may determine expected end time of backup jobs in a first backup job subset in the plurality of backup job subsets. Still referring to the example of FIG. 4, the first subset is used as an example of the first backup job subset. Computing device 120 may, for example, determine the expected end time as $T_2$ based on the expected execution time of backup job 331 in the first subset.

At block 504, computing device 120 may determine a target time point based on the expected end time. Specifically, computing device 120 may, for example, determine the latest expected end time in this backup job subset as the target time point. For the example of FIG. 4, considering that there is only one backup job 331 in the first backup job subset, computing device 120 may determine the expected end time $T_2$ as the target time point.

At block 506, computing device 120 may set the expected start time of the backup jobs in the second backup job subset in the plurality of backup job subsets to be later than the target time point. In some embodiments, in order to avoid the influence caused by the instability of the duration of each backup process, computing device 120 may set a time buffer window between the executions of the backup jobs from different subsets. For example, computing device 120 may set a time point $T_3$ at a period of time after the expected end time $T_2$ as the expected start time of the second backup job subset. It should be understood that the lengths of the time buffer windows between different backup job subsets that are not executed concurrently may be set as different sizes as needed.

By setting the time buffer windows, computing device 120 can ensure that the execution of a previous backup job will no longer affect the time point when a subsequent backup job begins to be executed, thereby ensuring that the backup jobs are always backed up at the frequency expected by a user. This may further reduce the risk of loss of the backup data due to failure to satisfy the backup frequency.

In some embodiments, computing device 120 may also adjust the predetermined start time of the backup jobs. Specifically, computing device 120 may determine the predetermined start time of the group of to-be-executed backup jobs based on the execution plan associated with the group of to-be-executed backup jobs. Taking FIG. 3 as an example, computing device 120 may, for example, determine the predetermined start time of backup job 330 to backup job 331 as $T_0$.

Further, computing device 120 may also adjust the execution plan according to determination of idle time existing before the predetermined start time of at least one backup job in the group of to-be-executed backup jobs, so that the at least one backup job is executed before the predetermined start time. As shown in FIG. 4, computing device 120 may, for example, determine that the backup system has certain idle time before the time point $T_0$ according to the execution plan of all the backup jobs. On the premise that the previous backup jobs have a certain time buffer window, computing device 120 may cause at least one backup job to be executed before the predetermined start time. For example, computing device 120 may cause backup job 331 to be executed at the time $T_1$ before the predetermined start time $T_0$. By utilizing the idle time of the system to the maximum extent, the embodiment of the present disclosure may further improve the efficiency of the backup system.

Figure 6:
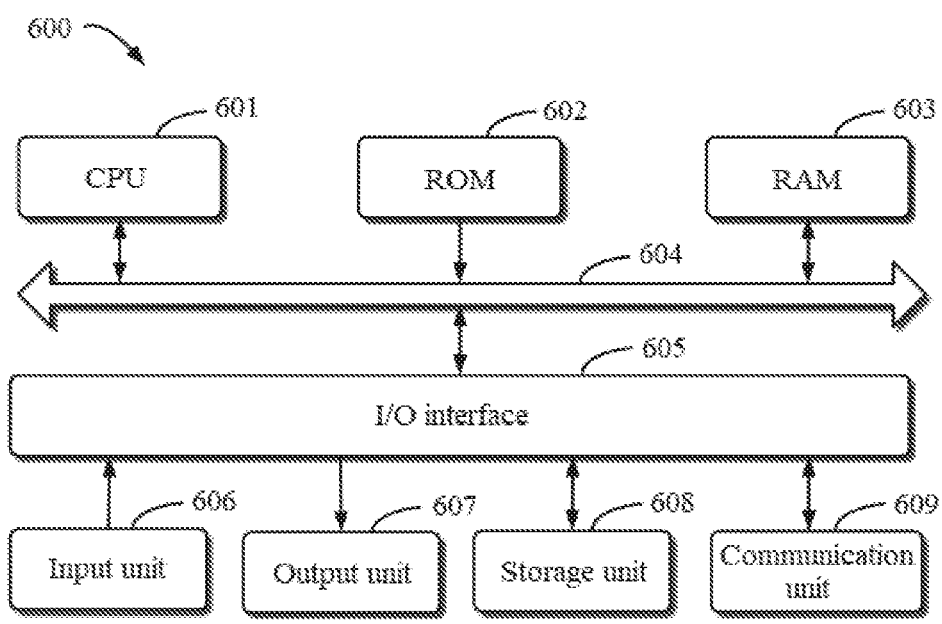
FIG. 6 illustrates a schematic block diagram of an example device configured to implement the embodiments of the summary of the present disclosure.

FIG. 6 illustrates a schematic block diagram of example device 600 configured to implement the embodiments of the summary of the present disclosure. For example, computing device 120 according to the embodiment of the present disclosure may be implemented by device 600. As shown in the figure, device 600 includes central processing unit (CPU) 601, which may perform various appropriate actions and processing according to a computer program instruction stored in read-only memory (ROM) 602 or a computer program instruction loaded from storage unit 608 into random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

Several components in device 600 are connected to I/O interface 605, including: input unit 606, such as a keyboard and a mouse; output unit 607, such as various types of displays and speakers; storage unit 608, such as a disk and an optical disc; and communication unit 609, such as a network card, a modem, and a wireless communication transceiver. Communication unit 609 allows device 600 to exchange information/data with other devices through a computer network, such as the Internet, and/or various telecommunication networks.

The various processes and processing described above, such as process 200, may be performed by processing unit 601. For example, in some embodiments, process 200 may be implemented as a computer software program that is tangibly included in a machine-readable medium, such as storage unit 608. In some embodiments, part or all of computer programs may be loaded and/or installed on device 600 via ROM 602 and/or communication unit 609. When the computer programs are loaded into RAM 603 and executed by CPU 601, one or more actions of process 200 described above may be executed.

The present disclosure may be a method, an apparatus, a system, and/or a computer program product. The computer program product may include a computer-readable storage medium on which computer-readable program instructions configured to execute various aspects of the present disclosure are stored.

The computer-readable storage medium may be a tangible device that may maintain and store instructions used by an instruction execution device. The computer-readable storage medium may be, for example, but not limited to, an electric storage device, a magnetic storage device, an optical storage device, an electromagnetic storage device, a semiconductor storage device, or any suitable combination of the foregoing. More specific examples (non-exhaustive list) of computer-readable storage media include: portable computer disks, hard disks, random access memories (RAMs), read-only memories (ROMs), erasable programmable read-only memories (EPROMs or flash memories), static random access memories (SRAMs), portable compact disc read-only memories (CD-ROMs), digital versatile discs (DVDs), memory sticks, floppy disks, mechanical encoding devices such as a punch card or a protruding structure in a groove stored with instructions, and any suitable combination of the foregoing. The computer-readable storage media used here are not interpreted as transient signals per se, such as radio waves or other freely propagated electromagnetic waves, electromagnetic waves propagated through waveguides or other transmission media (such as light pulses passing through fiber optic cables), or electrical signal transmitted via electrical wires.

The computer-readable program instructions described here can be downloaded from the computer-readable storage media to various computing/processing devices, or downloaded to an external computer or external storage device via a network, such as the Internet, a local area network, a wide area network and/or a wireless network. The network may include a copper transmission cable, fiber optic transmission, wireless transmission, a router, a firewall, a switch, a gateway computer and/or an edge server. A network adapter card or network interface in each computing/processing device receives the computer-readable program instruction from the network, and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source or object codes written in any combination of one or more programming languages. The programming languages include object-oriented programming languages, such as Smalltalk and C++, and conventional procedural programming languages, such as "C" language or similar programming languages. The computer-readable program instructions may be executed entirely on a user computer, executed partially on a user computer, executed as a stand-alone software package, executed partially on a user computer and partially on a remote computer, executed entirely on a remote computer or executed on a server. In case that a remote computer is involved, the remote computer can be connected to a user computer through any kind of networks, including a local area network (LAN) or a wide area network (WAN), or connected to an external computer (such as through the Internet by using an Internet service provider). In some embodiments, an electronic circuit is personalized by using state information of the computer-readable program instructions, such as a programmable logic circuit, a field programmable gate array (FPGA), or a programmable logic array (PLA). The electronic circuit may execute the computer-readable program instructions to implement various aspects of the present disclosure.

Various aspects of the present disclosure are described here with reference to the flow charts and/or block diagrams of the method, the apparatus (system) and the computer program product according to the embodiments of the present disclosure. It should be understood that each block of the flow charts and/or block diagrams and combinations of various blocks in the flow charts and/or block diagrams can be implemented by the computer-readable program instructions.

These computer-readable program instructions can be provided to a processing unit of a general-purpose computer, a special-purpose computer, or other programmable data processing apparatuses, thereby producing a machine, so that when these instructions are executed by the processing unit of the computer or other programmable data processing apparatuses, a device for implementing the functions/actions specified in one or more blocks in the flow charts and/or the block diagrams is generated. These computer-readable program instructions may also be stored in a computer-readable storage medium, and these instructions cause a computer, a programmable data processing apparatus, and/or other devices to work in a specific manner. Therefore, the computer-readable medium storing the instructions includes: an article of manufacture that includes instructions for implementing various aspects of the functions/actions specified in one or more blocks in the flow charts and/or the block diagrams.

The computer-readable program instructions can also be loaded onto a computer, other programmable data processing apparatuses, or other device, so that a series of operating steps can be performed on the computer, other programmable data processing devices, or other devices to produce a computer-implemented process, so that the instructions executed on the computer, other programmable data processing apparatuses, or other devices implement the functions/actions specified in one or more blocks in the flow charts and/or the block diagrams.

The flow charts and the block diagrams in the figures illustrate architectures, functions, and operations of possible implementations of systems, methods and computer program products according to various embodiments of the present disclosure. In this regard, each block in the flow charts or the block diagrams may represent a part of a module, a program segment or an instruction, and a part of the module, the program segment or the instruction comprises one or more executable instructions for realizing a specified logic function. The functions marked in the block may also happen in an order different from that marked in the accompanying drawing in some alternative implementations. For example, actually, two continuous blocks may be basically concurrently executed and may also be executed according to the opposite order sometimes, depending on the functions involved. It should also be noted that each block in the block diagrams and/or the flow charts as well as a combination of the blocks in the block diagrams and/or the flow charts may be realized by using a special system used for executing the specified function or action and based on hardware or may be realized by using a combination of special hardware and a computer instruction.

Various implementation modes of the present disclosure have been described above, and the above description is exemplary, not exhaustive, and is not limited to the disclosed implementation modes. Many modifications and changes will be apparent to those skilled in the art without departing from the scope and spirit of the various described implementation modes. The selection of terms used herein is intended to best explain the principles and actual applications of the various implementation modes, or improvements on the technologies in the market, or is intended to enable others of ordinary skill in the art to understand various implementation modes disclosed herein.

The invention claimed is:

1. A method for managing backup jobs, comprising:
determining expected execution durations of a group of to-be-executed backup jobs;
dividing the group of to-be-executed backup jobs into a plurality of backup job subsets based on the expected execution durations, wherein a difference between the expected execution durations of every pair of backup jobs in each backup job subset does not exceed a preset threshold duration; and
adjusting an execution plan of the group of to-be-executed backup jobs to cause the backup jobs in at least one backup job subset in the plurality of backup job subsets to simultaneously begin to be executed.

2. The method according to claim 1, further comprising:
determining a predetermined start time of the group of to-be-executed backup jobs based on the execution plan; and
adjusting the execution plan according to determination of idle time existing before the predetermined start time of at least one backup job in the group of to-be-executed backup jobs, to cause the at least one backup job to be executed before the predetermined start time.

3. The method according to claim 1, wherein determining the expected execution durations comprises:
acquiring historical execution information for a group of historical backup jobs; and
determining the expected execution durations based on the historical execution information.

4. The method according to claim 1, wherein adjusting the execution plan further comprises:
determining an expected end time of backup jobs in a first backup job subset in the plurality of backup job subsets;
determining a target time point based on the expected end time; and
setting the expected start time of the backup jobs in a second backup job subset in the plurality of backup job subsets to be later than the target time point.

5. The method according to claim 1, wherein a number of backup jobs in each backup job subset does not exceed a predetermined threshold number.

6. An electronic device, comprising:
at least one processing unit;
at least one memory, coupled to the at least one processing unit and storing an instruction configured to be executed by the at least one processing unit, wherein the instruction is executed by the at least one processing unit to cause the device to execute actions, and the actions comprise:
 determining expected execution durations of a group of to-be-executed backup jobs;
 dividing the group of to-be-executed backup jobs into a plurality of backup job subsets based on the expected execution durations, wherein a difference between the expected execution durations of every pair of backup jobs in each backup job subset does not exceed a preset threshold duration; and
 adjusting an execution plan of the group of to-be-executed backup jobs to cause the backup jobs in at least one backup job subset in the plurality of backup job subsets to simultaneously begin to be executed.

7. The electronic device according to claim 6, wherein the actions further comprise:
 determining a predetermined start time of the group of to-be-executed backup jobs based on the execution plan; and
 adjusting the execution plan according to determination of idle time existing before the predetermined start time of at least one backup job in the group of to-be-executed backup jobs, to cause the at least one backup job to be executed before the predetermined start time.

8. The electronic device according to claim 6, wherein determining the expected execution durations comprises:
 acquiring historical execution information for a group of historical backup jobs; and
 determining the expected execution durations based on the historical execution information.

9. The electronic device according to claim 6, wherein adjusting the execution plan comprises:
 determining an expected end time of backup jobs in a first backup job subset in the plurality of backup job subsets;
 determining a target time point based on the expected end time; and
 setting the expected start time of the backup jobs in a second backup job subset in the plurality of backup job subsets to be later than the target time point.

10. The electronic device according to claim 6, wherein a number of backup jobs in each backup job subset does not exceed a predetermined threshold number.

11. A computer program product, stored in a non-transient computer storage medium and comprising a machine-executable instruction, wherein the machine-executable instruction is operated in a device to cause the device to execute a method, the method comprising:
 determining expected execution durations of a group of to-be-executed backup jobs;
 dividing the group of to-be-executed backup jobs into a plurality of backup job subsets based on the expected execution durations, wherein a difference between the expected execution durations of every pair of backup jobs in each backup job subset does not exceed a preset threshold duration; and
 adjusting an execution plan of the group of to-be-executed backup jobs to cause the backup jobs in at least one backup job subset in the plurality of backup job subsets to simultaneously begin to be executed.

12. The computer program product according to claim 11, wherein the method further comprises:
 determining a predetermined start time of the group of to-be-executed backup jobs based on the execution plan; and
 adjusting the execution plan according to determination of idle time existing before the predetermined start time of at least one backup job in the group of to-be-executed backup jobs, to cause the at least one backup job to be executed before the predetermined start time.

13. The computer program product according to claim 11, wherein determining the expected execution durations comprises:
 acquiring historical execution information for a group of historical backup jobs; and
 determining the expected execution durations based on the historical execution information.

14. The computer program product according to claim 11, wherein adjusting the execution plan comprises:
 determining an expected end time of backup jobs in a first backup job subset in the plurality of backup job subsets;
 determining a target time point based on the expected end time; and
 setting the expected start time of the backup jobs in a second backup job subset in the plurality of backup job subsets to be later than the target time point.

15. The computer program product according to claim 11, wherein a number of backup jobs in each backup job subset does not exceed a predetermined threshold number.

* * * * *